United States Patent [19]

Poarch

[11] 4,065,300
[45] Dec. 27, 1977

[54] METHOD FOR EXTRACTION OF COPPER PRODUCTS FROM COPPER BEARING MATERIAL

[76] Inventor: Archie L. Poarch, Mesa, Ariz.

[21] Appl. No.: 700,410

[22] Filed: June 28, 1976

[51] Int. Cl.² .......................................... C22B 15/08
[52] U.S. Cl. ................................. 75/117; 75/101 R; 75/103; 75/108; 423/32; 423/35; 423/604
[58] Field of Search ........................ 75/117, 103, 108; 423/32, 35, 604

[56] References Cited

U.S. PATENT DOCUMENTS

| | | | |
|---|---|---|---|
| 3,228,765 | 1/1966 | Chupungco et al. .................. | 75/117 |
| 3,457,035 | 7/1969 | Barker .................................. | 423/604 |
| 3,492,115 | 1/1970 | Mahalla ................................. | 75/103 |
| 3,760,070 | 9/1973 | Joice et al. ........................... | 423/604 |

Primary Examiner—G. Ozaki
Attorney, Agent, or Firm—Warren F. B. Lindsley

[57] ABSTRACT

Cuprous oxide and finely divided metallic copper are recovered from copper bearing material by an improved chemical process involving the dissolving of the copper bearing material in a solution of ammonium nitrate having an excess of $NO_3^=$ ions to form a cupric ammonium complex which then collects additional copper ions to form a cuprous ammonium nitrate. The cuprous ammonium nitrate is then broken down chemically to cuprous oxide and finely divided metallic copper.

10 Claims, 1 Drawing Figure

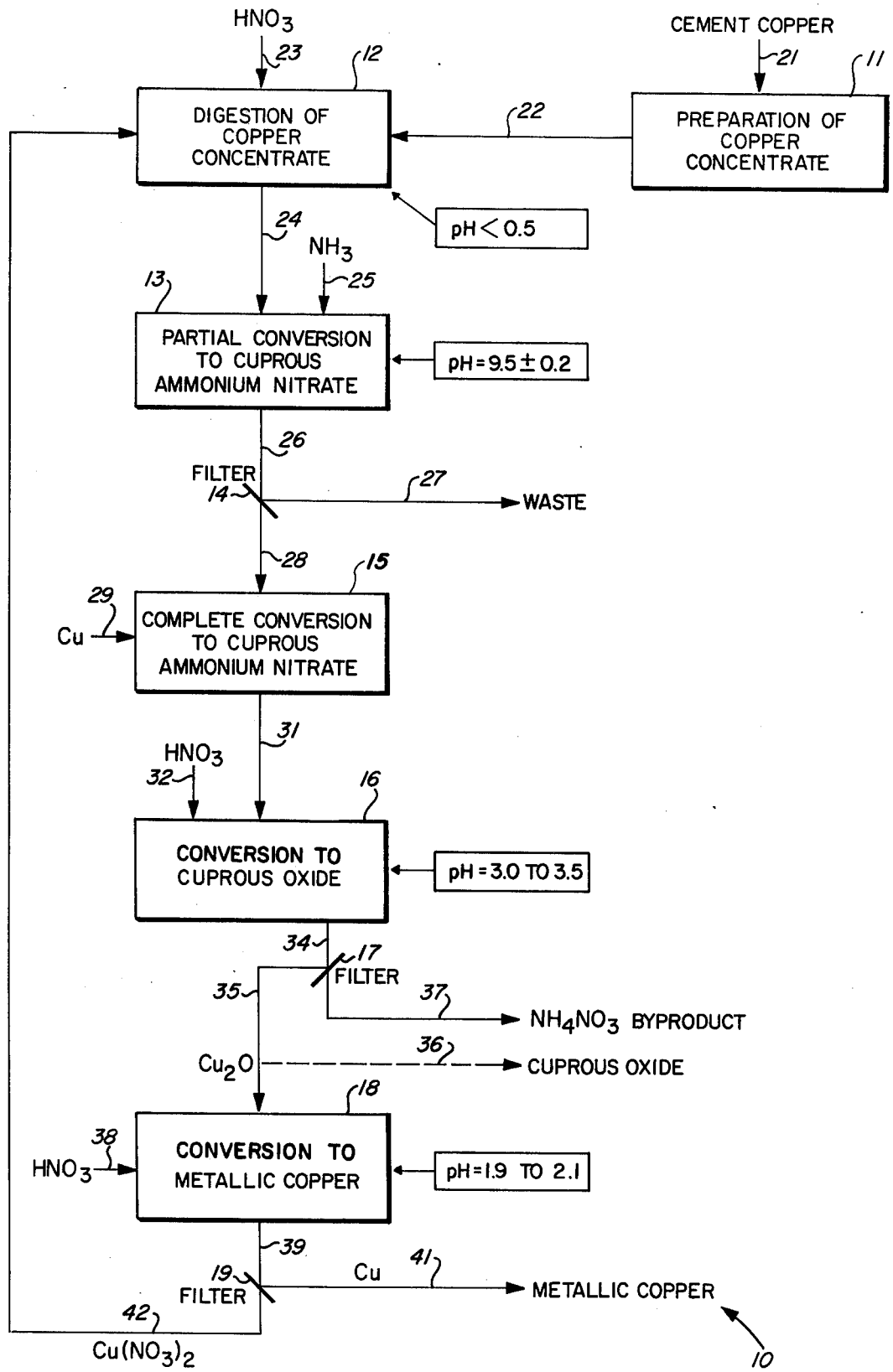

METHOD FOR EXTRACTION OF COPPER PRODUCTS FROM COPPER BEARING MATERIAL

BACKGROUND OF THE INVENTION

With the gradual depletion of the richer ore deposits, the recovery of valuable metals and metal products from lowgrade ores and from the tailings of mining and processing operations becomes increasingly important. To permit the efficient extraction of metals from these sources, improved recovery means are urgently needed. The present invention falls within this category, providing an improved method for extracting finely divided metallic copper and/or cuprous oxide from copper precipitate or "cement copper" or any other copper bearing material.

For many years the copper mining industry has produced a low-grade byproduct known as copper precipitate or "cement copper". Cement copper is derived from relatively weak aqueous solutions of copper salts, notably copper sulfate. Such weak solutions of copper salts can be prepared by percolating large quantities of weak sulfuric acid over massive beds of low-grade copper oxide ore. Alternatively, such solutions may be obtained by pumping underground water from copper mines, from spent pickle liquors in brass and copper mills, and in various other operations.

To prepare the copper precipitate or "cement copper," the weak copper-bearing solutions are contacted in large tanks or water storage and distribution vessels with scrap iron. The scrap iron is usually shredded cans or other iron or steel wastes from metal-working and manufacturing operations.

Copper is precipitated from the weak copper sulfate solution according to the following equation:

$$CuSO_4 + Fe \rightarrow FeSO_4 + Cu$$

The resultant fine copper precipitate sludge or "cement copper" is heavily contaminated with iron and contains substantial amounts of other impurities such as carbonaceous materials, base metals and basic metallic salts, etc. In a typical case, the cement copper will average upwards of 60 percent to 85 percent copper. For example, a typical cement copper, after removal from the precipitation tanks, exhibits the following characteristics:

TABLE A

| Screen Size | Percent Weight | Impurities | |
|---|---|---|---|
| +65 | 6.1 | Acid insolubles | 2.7 |
| +100 | 1.6 | Ammonia insolubles | 4.3 |
| +200 | 3.4 | Copper content | 81.5 |
| +325 | 7.6 | | |
| −325 | 81.3 | | |

Cement copper particles are dendritic, a characteristic that imparts a distinct advantage in the field of powder metallurgy as the particles tend to bind together when subjected to high pressures. This advantage is offset, however, by the presence of many impurities in cement copper which render the material unsuitable for direct use in powder metallurgy and related fields.

Consequently, cement copper has not generally been regarded as suitable for semi-direct conversion to valuable copper products by purely chemical methods. Rather, cement copper was ordinarily introduced into the pyrometallurgical copper smelting process, either at the reverberatory furnace or the converting stage. In one instance, cement copper was converted to useful copper products by dissolving the cement copper in sulfuric acid followed by electrolysis of the copper sulfate. More recently, cement copper was dissolved in the sulfuric acid and the resulting copper sulfate was catalytically reduced at elevated pressure with hydrogen. However, such electrolytic or catalytic reduction processes do not favorably compare with chemical purification procedures because of cost and complexity of the operations.

Recently, however, certain chemical processes have been proposed for the separation of cuprous oxide and metallic copper from copper precipitate.

Cuprous oxide $Cu_2O$ is a dark red or carmine-red crystal or powder which is used in the production of copper salts, in ceramics, and for the development of porcelain red glaze and red glass. It is important in electroplating and in antifouling paints. It is also of value in agriculture as a seed treatment material to control seed-borne and soil-borne disease organisms, and although other compounds may be used, it is still the best fungicide for certain crop seed treatments, and has gained recent acceptance as a fungicide on citrus fruits.

Metallic copper is recently in great demand in the electronics industry where it is employed as a conductive coating over a ceramic substrate. Very finely divided particles of high-purity copper are required for this application. Copper in this form is most readily obtained by chemical precipitation.

DESCRIPTION OF THE PRIOR ART

Prior art processes involving the chemical extraction of copper products from "cement copper " include the following:

E. J. Chupungco, Jr. et al (U.S. Pat. No. 3,228,765) forms a cupric ammonium nitrate complex which he then treats with sulfur dioxide to form a crystalline solid precipitate. The precipitate is then treated with sulfuric acid to produce metallic copper.

J. E. Barker (U.S. Pat. No. b 3,457,035) produces cuprous oxide from copper concentrates by leaching with cupric ammonium carbonate solution to form a cuprous ammonium carbonate and a coating of cuprous oxide on the surface of the metallic copper, simultaneously subjecting the cuprous oxide coated copper to an attriting or rubbing action whereby cuprous oxide is continually formed and deposited in the solution. The solution containing the cuprous oxide as a slurry is treated with a flocculent and filtered to separate the cuprous oxide product. The solution of cuprous ammonium carbonate is then oxidized and recycled into the reactor.

S. Mahalla (U.S. Pat. No. 3,492,115) proposes a process comprising the following steps: (a) separating a copper concentrate from the cement copper; (b) preparing a cupric ammonia complex solution by reacting the concentrate with oxygen and an aqueous solution of complexing reagents comprising ammonia and an ammonium salt selected from the class consisting of ammonium carbonate and ammonium sulfate; (c) reducing the cupric ammonia complex to the corresponding cuprous ammonia complex by reacting the solution with a reducing agent which is either sulfur dioxide or the cement copper concentrate prepared in step (a); (d) decomposing the cuprous ammonia complex to obtain a copper product, either copper metal or cuprous oxide, recovering at least a portion of the complexing reagents; and (e) recycling the recovered complexing reagents for use in preparing additional cupric ammonia complex solution as in step (b).

While the foregoing procedures provided by the prior art have met with a degree of success, it is desirable to eliminate certain features characteristic of these procedures such as the introduction of carbonates, sulfates and sulfur dioxides which tend to complicate the separation of copper or cuprous oxide from the solution in a highly purified state. A method which permits better control of the process by automatic means is also to be desired.

SUMMARY OF THE INVENTION

In accordance with the invention claimed a new and improved chemical process is provided for the extraction of finely divided metallic copper and/or cuprous oxide from copper precipitate or cement copper or any other copper bearing material.

It is therefore a primary object of the present invention to provide a process for preparing high-purity copper products from cement copper.

Another object of the invention is to provide such a process which involves purely chemical transformations of the raw material and which avoids the disadvantages of electrolytic or catalytic processes.

A further object of the invention is to provide a process for preparing high-purity copper products without employing pyrometallurgical techniques.

A still further object of the invention is to prepare stable, high-purity, finely divided, cuprous oxide products especially suitable for use as red pigments in marine coatings.

A still further object of the invention is to provide a process for preparing bright copper powders of suitable purity for use in powder metallurgy and related fields.

A still further object of the invention is to provide such a process which utilizes a minimum number of added materials so as to minimize the complexity of the process and the difficulty of producing a chemically pure end product.

Yet another object of the invention is to provide such a process which is readily controllable by automatic means.

Further objects and advantages of the invention will become apparent as the following description proceeds and the features of novelty which characterize the invention will be pointed out with particularity in the claims annexed to and forming a part of this specification.

BRIEF DESCRIPTION OF THE DRAWING

The present invention may be more readily described by reference to the accompanying drawing in which:

The figure is a flow sheet generally illustrating the process of the present invention.

DESCRIPTION OF THE PREFERRED EMBODIMENT

Referring more particularly to the drawing by characters of reference, the copper products extraction process 10 of the invention comprises a series of operations including the preparation of the copper concentrate shown as operation 11, the digestion of the copper concentrate shown as operation 12, partial conversion to cuprous ammonium nitrate, in operation 13, filtration to remove waste in operation 14, completion of conversion to cuprous ammonium nitrate in operation 15, extraction of cuprous oxide in operation 16, separation of cuprous oxide and ammonium nitrate by filtration in operation 17, extraction of metallic copper in operation 18, and filtration of metallic copper in operation 19.

Specific procedures employed in operation 11 for the preparation of the copper concentrate from the raw material cement copper 21 are not critical to the working of the invention, and any of the procedures common to the art may be employed. Such procedures have included reaction of dilute aqueous copper sulfate solutions with metallic iron to obtain the raw cement copper which is then subjected to size separation by cycloning or screening. Undersized material is agitated with dilute sulfuric acid to form a slurry which is agitiated to convert iron and salt impurities to soluble sulfates. Acid washing follows to remove the bulk of the impurities.

In operation 12 the copper concentrate 22 is introduced into a sealed leaching tank where a 70% by volume solution of nitric acid ($HNO_3$) 23 is added while maintaining a pH of 0.5 or less. The nitric acid dissolves the copper from the concentrate forming copper nitrate ($CuNO_3$) plus 1 mole of $HNO_3$ in excess. The process is continued until the solution is loaded to approximately 40 grams per liter. The total charge 24 including the copper nitrate and the partially-depleted copper concentrate is then transferred to vacuum conditions in a second leaching tank for the initiation of operation 13.

In operation 13, the tank is again sealed to exclude oxygen. Ammonia ($NH_3$), 25, is introduced while carefully controlling the pH as closely as possible to 9.5. The copper nitrate and the ammonia combine as follows: $CuNO_3 + HNO_3 + 4NH_3$ to form a cupric ammine, $Cu(NH_3)_4(NO_3)_2$. The cupric ammine then combines with additional copper drawn from the partially depleted copper concentrate to form a cuprous complex as given by equation (1):

$$Cu/Cu + Cu(NH_3)_4(NO_3)_2 = Cu_2(NH_3)_4(NO_3)_2 \tag{1}$$

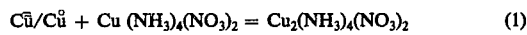

The control of the pH level is especially critical in operation 13 as is the exclusion of oxygen. With proper control of the pH, maximum conversion efficiency is achieved, the efficiency peaking sharply at the optimum pH value. Exposure to oxygen causes the process to reverse.

At the completion of operation 13 in which the solution is loaded to a copper content of approximately 75 grams per liter, the product 26 of operation 13 is filtered in operation 14 to remove and discard waste materials 27 including for the most part sand and rock particles. The filtrate 28 containing both cupric and cuprous ammines is passed into another sealed tank for the initiation of operation 15.

In operation 15 the conversion to the cuprous ammonium nitrate, $Cu_2(NH_3)_4(NO_3)_2$, is completed by adding an excess of metallic copper 29 in the form of wire or in some other solid form, the residue of which can be removed at the end of the operation.

In each of the operations 12–15 air or oxygen is eliminated from the closed tanks prior to the introduction of the charge by purging the chamber with nitrogen and maintaining an oxygen free atmosphere thereafter.

At the completion of operation 15 the cuprous ammonium nitrate 31 is transferred to another tank in preparation for the extraction of cuprous oxide as accomplished in operation 16.

In operation 16 a 30 percent solution by volume of nitric acid 32 is added to the cuprous ammonium nitrate 31 from operation 15. The mixture maintained at temperatures of 110° Fahrenheit to 120° Fahrenheit is agitated in 33 at atmospheric pressure while maintaining a pH of 3.0 – 3.5, the acidity being maintained automatically by means of a regulator valve which introduces the nitric acid. The resulting reaction is given by equation (2):

$$Cu_2(NH_3)_4(NO_3)_2 + 2HNO_3 + H_2O = Cu_2O + 4NH_4NO_3 \qquad (2)$$

As indicated by equation (2) the desired cuprous oxide $Cu_2O$ formed as a precipitate in a solution of water and ammonium nitrate $NH_4NO_3$. The maintenance of the proper pH level, this time at 3.0 – 3.5, is again particularly important to achieve an optimum process.

The cuprous oxide and ammonium nitrate solution 34 produced by operation 16 is then filtered in operation 17. The cuprous oxide 35 may be marketed directly as a product 36 or it may be delivered to operation 18 for reduction to metallic copper. The ammonium nitrate 37 which is separated as the filtrate is a marketable byproduct for use as a fertilizer.

In operation 18 the cuprous oxide 35 is treated with a 30% solution by volume of nitric acid 38 at a pH level controlled to a value between 1.9 and 2.1, the pH level again being very critical. (Lower values of the pH level cause the copper to dissolve and higher values inhibit the reduction process.) From the resulting reaction metallic copper and copper nitrate are obtained as given by equation (3):

$$Cu_2O + 2HNO_3 \rightarrow Cu(NO_3)_2 + Cu \qquad (3)$$

The product of equation (3) comprising the output 39 of operation 18 is filtered in operation 19 to separate the metallic copper 41 from the filtrate 42 which is a solution of copper nitrate $Cu(NO_3)_2$ and nitric acid. The copper 41 is dried and marketed as the primary end product of the process 10, and the filtrate 42 is returned to operation 12.

It will be noted from equation (3) that 50 percent of the total copper content delivered by operation 18 is recycled in the form of copper nitrate, $CuNO_3$. This recirculated copper is, of course, not representative of an accumulative loss but is simply utilized as an element of the process 10.

In the implementation of the foregoing procedures, the maintenance of a favorable pH level was found to be expecially important. Following the recognition of this factor, a laboratory experiment was carried out to optimize the process in terms of the pH level.

The experiment involved the processing of three different samples of cuprous ammonium nitrate, $Cu_2(NH_3)_4(NO_3)_2$, which had been formed by tumbling, in a sealed container, and a quantity of copper wire with a cupric ammonium nitrate solution at a pH of 9.2. Each of the three samples of the cuprous ammonium nitrate was reacted with a 50% by volume solution of nitric acid at a controlled pH level for the precipitation of cuprous oxide, $Cu_2O$. The cuprous oxide was then filtered and washed, then reacted again with another 50% by volume solution of nitric acid at a second controlled pH level to extract metallic copper. Different controlled pH levels or processing durations were employed for the three different samples. The percentage of the total copper content removed as metallic copper was then determined as a measure of the conversion efficiency.

Significant data taken from the three samples processed is given in Table I below:

Table I

|  | Sample | | |
|---|---|---|---|
|  | #1 | #2 | #3 |
| (A) pH during formation of $Cu_2O$ | 4.3 | 5.5 | 5.5 |
| (B) duration of $Cu_2O$ generation (hours) | 1.0 | 2.5 | 3.5 |
| (C) copper content of $Cu_2O$ filtrate (mg) | 40.6 | 9.9 | 27.4 |
| (D) pH during extraction of metallic copper | 1.5 | 1.8 | 1.8 |
| (E) copper content of $Cu(NO_3)_2$ from copper extraction (mg) | 98.8 | 230 | 271 |
| (F) weight of extracted copper (mg) | 137 | 70.2 | 52.5 |
| (G) extracted copper as % of total copper content, i.e. F as percent of (C + E + F) | 50% | 23% | 15% |

Test sample #1 produced metallic copper of a good color and flocculation with no $NO_2$ fumes during the reduction of the metal. In the case of samples #2 and #3, the reduced copper powder was very dark in color, almost black, and there was much gassing after reduction.

As the result of this experiment and the following further refinements of the process, it was established that the pH should be held within the range of 3.0 to 3.5 during the formation of the cuprous oxide and at 1.9 to 2.1 during the formation of metallic copper and copper nitrate. It is to be noted that the longer periods provided for $Cu_2O$ generation in sample #2 and especially in the case of sample #3 were not effective in overcoming the effect of the more favorable pH levels for sample #1.

A simple and effective process is thus provided for the extraction of metallic copper and cuprous oxide from the copper concentrate. The process utilizes a minimum number of added chemicals including only nitric acid and ammonia which, in turn include only three elements, hydrogen, nitrogen and oxygen.

As the individual operations clearly indicate, the limited number of such elements introduced greatly simplifies the total process and facilitates the separation of the copper products from the solutions. This is in contrast to the prior art processes which introduce a multiplicity of reactive agents including sulfur dioxide, ammonium sulfate, ammonium carbonate, sulfuric acid, sodium hydroxide and ammonia, all of which must again be separated from the copper products in the course of the process. Furthermore, there is no loss of the added reactive agents in the case of the present invention, the only byproduct being readily marketable as a commercial fertilizer.

Although but a single embodiment of the present invention has been illustrated and described, it will be apparent to those skilled in the art that various changes and modifications may be made therein without departing from the spirit of the invention or from the scope of the appended claims.

What is claimed is:

1. An integrated process for preparing high-priority copper products from material comprising cement copper and/or other copper bearing materials comprising the steps of:
   a. separating a powdered copper concentrate from said material;
   b. preparing a copper nitrate solution in which copper is substantially the only metal ion present by reacting said concentrate in the presence of nitrogen with an aqueous solution of nitric acid to obtain copper nitrate in solution;

c. substantially completely reducing said copper nitrate with ammonia and copper bearing materials in the absence of oxygen to obtain cuprous ammonium nitrate in solution, d. agitating said cuprous ammonium nitrate while maintaining a pH of approximately 3.0 to 3.5 and temperature of approximately 110 degrees Fahrenheit to 120 degrees Fahrenheit to obtain cuprous oxide, and e. decomposing substantially all of said cuprous oxide with nitric acid to obtain metallic copper and copper nitrate in solution.

2. The integrated process set forth in claim 1 in further combination with the step of:
ammoniating said copper nitrate, and
recycling the copper nitrate for use in step (b).

3. The integrated process of claim 1 wherein:
the step of preparing cuprous ammonium nitrate solution is obtained by adjusting the copper nitrate with ammonium hydroxide to a pH of approximately 9.5.

4. The integrated process of claim 3 wherein:
when said nitric acid solution has been loaded with approximately 40 grams per liter of copper, it is transferred along with the copper bearing material, to a vacuum.

5. The integrated process of claim 1 wherein:
the preparation of the copper nitrate solution of step (b) is accomplished while maintaining a pH of approximately 0 to 0.5.

6. The integrated process of claim 1 wherein:
copper nitrate is added to step (b) to dissolve the copper concentrate in the formation of cuprous ammonium nitrate.

7. The integrated process of claim 6 wherein:
approximately a 5 to 10 percent excess of copper nitrate is added to step (b) above that needed to prepare the cuprous ammonium nitrate solution to assure total depletion of the copper content of the concentrate.

8. The integrated process of claim 1 in further combination with the step of:
purging the reaction chambers in which steps (b) and (c) are performed to remove air and/or oxygen.

9. The integrated process of claim 1 in further combination with the step of:
purging the reaction chamber in which the cuprous ammonium nitrate solution of step (b) is prepared with nitrogen.

10. The integrated process of claim 1 in further combination with the step of:
purging the reaction chambers in which steps (b) and (c) are performed with nitrogen to remove any air or oxygen therein:

* * * * *